United States Patent [19]

Kaneko et al.

[11] Patent Number: 4,669,841
[45] Date of Patent: Jun. 2, 1987

[54] ROTARY SHUTTER

[75] Inventors: Kouji Kaneko; Motohiko Horio; Naoki Kobayashi; Fujio Okada, all of Saitama, Japan

[73] Assignee: Fuji Photo Optical Co., Ltd., Saitama, Japan

[21] Appl. No.: 877,427

[22] Filed: Jun. 23, 1986

[30] Foreign Application Priority Data

Jun. 21, 1985 [JP] Japan .................. 60-134297

[51] Int. Cl.⁴ .............................................. G03B 9/10
[52] U.S. Cl. .................... 352/216; 352/180; 352/182; 352/169; 354/252; 354/254; 354/258.1
[58] Field of Search ............... 352/180, 182, 169, 216, 352/217; 354/252, 254, 258.1

[56] References Cited

U.S. PATENT DOCUMENTS 3,196,457  7/1965  Buck ..................................... 352/216
4,022,525  5/1977  Boudouris ........................... 352/180
4,545,659  10/1985 Swinehart et al. ................. 352/216

Primary Examiner—Monroe H. Hayes
Attorney, Agent, or Firm—Young & Thompson

[57] ABSTRACT

A rotary shutter adapted to be used in an electronic still camera comprises a rotatable shutter having shutter openings which are variable in size. The shutter is rotated by an electric motor in order to open and close intermittently an exposure aperture of the camera. A phase detector for detecting the phase of rotation of the shutter member provides a series of phase signal, and cooperates with a signal generator for generating stop signals in synchronism with the phase signals when a particular shutter speed is selected and a circuit for braking the motor to stop the shutter member. Responsive to the particular shutter speed selecting operation, the shutter opening is opened to its maximum size and the rotary shutter is simultaneously stopped quickly in position so as to open fully the exposure aperture of the camera.

11 Claims, 6 Drawing Figures

ROTARY SHUTTER

BACKGROUND OF THE INVENTION

The present invention relates to a rotary shutter, and more particularly to a rotary shutter having stopping means which cause the rotary shutter to stop at a desired position where a shutter opening of the rotary shutter fully exposes an exposure aperture of a camera.

Generally, rotary shutters incorporated in electronic still cameras have a circular array of shutter openings on their shutter blades. This type of rotary shutter is driven by means of a servo-driving system to rotate the shutter blade at a constant speed in synchronism with driving-signals for scanning an image pickup element or image sensor usually placed behind an exposure aperture of the camera, in order to open and close intermittently the exposure aperture. After having reached a constant speed of rotation, the rotary shutter opens the exposure aperture simultaneously with every periodically generated vertical synchronizing signal which is contained in the image sensor driving signals for scanning. Consequently, it suffices to start the image pickup operation at the same time a first vertical synchronizing signal is generated after the actuation of a shutter button. In other words, there is no requirement to cause the synchonized opening of the exposure aperture with the vertical synchronizing signal every image pickup operation. This is of the particular advantage in achieving a favorable operation. In addition, continuous rotation of the rotary shutter makes it possible to achieve drastic reduction of time intervals at which consecutive still images are taken.

Twin blade rotary shutters are well known in the art of motion picture cameras as a said rotary shutter. This type of rotary shutter is of particular advantage in applications where it is necessary to vary shutter time or speed. For varying shutter speed, the twin blade rotary shutter is adapted such that two shutter blades are coaxially superposed for rotary displacement relative to each other in order to change the effective size shutter openings defined between the opposite edges of the openings of the respective shutter blades so as to select the proper shutter speed in accordance with brightness of ambient light and the subject to be photographed. As a result of changing the effective size of the shutter openings, a proper amount of light is allowed to pass through the exposure aperture, reaching the photoelectric conversion surface of the image sensor for an appropriate time.

The above-described type of twin blade rotary shutter used in electronic still cameras is also of particular advantage in applications where it is necessary to maintain the rotary shutter stopped so as continuously and fully to open the exposure aperture. Typically, this is often required when subjects with a low brightness are photographed or in the case of little ambient light or electronic still cameras having diaphragms incorporated therein. In the electronic still cameras of the type having the above-described twin blade rotary shutter, it is possible not only to pick up consecutive still images one for each vertical synchronizing signal contained in the image sensor driving signals for scanning but also to use the camera as a video camera for motion pictures or as a monitor camera.

The rotary shutter described above has disadvantages which make it difficult to implement it in certain environments. In particular, it may be mechanically difficult to stop the rotary shutter at the proper position. A rotary shutter having shutter openings whose size is large enough fully to open the exposure aperture is required to stop exactly at a position where any one of the shutter openings is in alignment with the exposure aperture. For this requirement, the rotary shutter is engaged, after stopping, by a mechanical positioning means in order to relocate the stopped rotary shutter in a correct position. Because of this relocation, it takes a relatively long time to perform the shutter stop operation which includes varying the size of the shutter openings to open fully the exposure aperture and adjusting the rotary shutter so as to bring any one of the shutter openings into alignment with the exposure aperture. In other words, electronic still cameras having a rotary shutter of this type are confronted with an increased time consumption problem when they are changed from an image pickup mode in which images are picked up by rotation of the rotary shutter (hereinafter referred to as the shutter rotating mode) to another mode in which images are picked up when the rotary shutter stops (hereinafter referred to as the shutter stopping mode).

OBJECTS OF THE INVENTION

It is, therefore, an object of the present invention to provide a rotary shutter which can be precisely stopped in a desired position when changed from the shutter rotating mode to the shutter stopping mode.

It is another object of the present invention to provide a rotary shutter which allows a quick mode changing operation.

It is a further object of the present invention to provide a rotary shutter in which no mechanical positioning means is required for relocating a stopped rotary shutter to its correct position.

SUMMARY OF THE INVENTION

Briefly, the rotary shutter in accordance with the present invention comprises phase signal producing means for producing a series of pulse signals whose frequency is proportional to the speed of rotation of the rotary shutter, stop signal generating means for generating stop signals in synchronism with the phase signals when selecting a particu- lar shutter speed, and means actuated by said stop signals for electrically braking a motor that rotates the rotary shutter to open and close intermittenly an exposure aperture of a camera.

In the illustrated embodiments, a braking circuit is adapted to shut off the motor so as to stop the rotary shutter in synchronism with its phase of rotation, such that the rotary shutter is stopped in a precise position where it fully opens the exposure aperture. The braking operation is effected responsive to a selection of a particular shutter speed which allows image pickup operations without rotating the rotary shutter.

According to the present invention, since the rotary shutter is electrically stopped at a position where the exposure aperture is fully opened when selecting a particular shutter speed, not only is there no need to adjust mechanically the rotary shutter in position after having stopped the same, but also the camera operation mode can be changed quickly from a shutter rotating mode to a shutter stopping mode.

BRIEF DESCRIPTION OF THE DRAWINGS

The nature of this invention, as well as other objects and advantages thereof, will be readily apparent from a consideration of the following description of the accompanying drawings, in which like reference numerals designate the same or similar parts throughout the figures thereof, and in which.

DETAILED DESCRIPTION OF THE INVENTION

Figure 1:
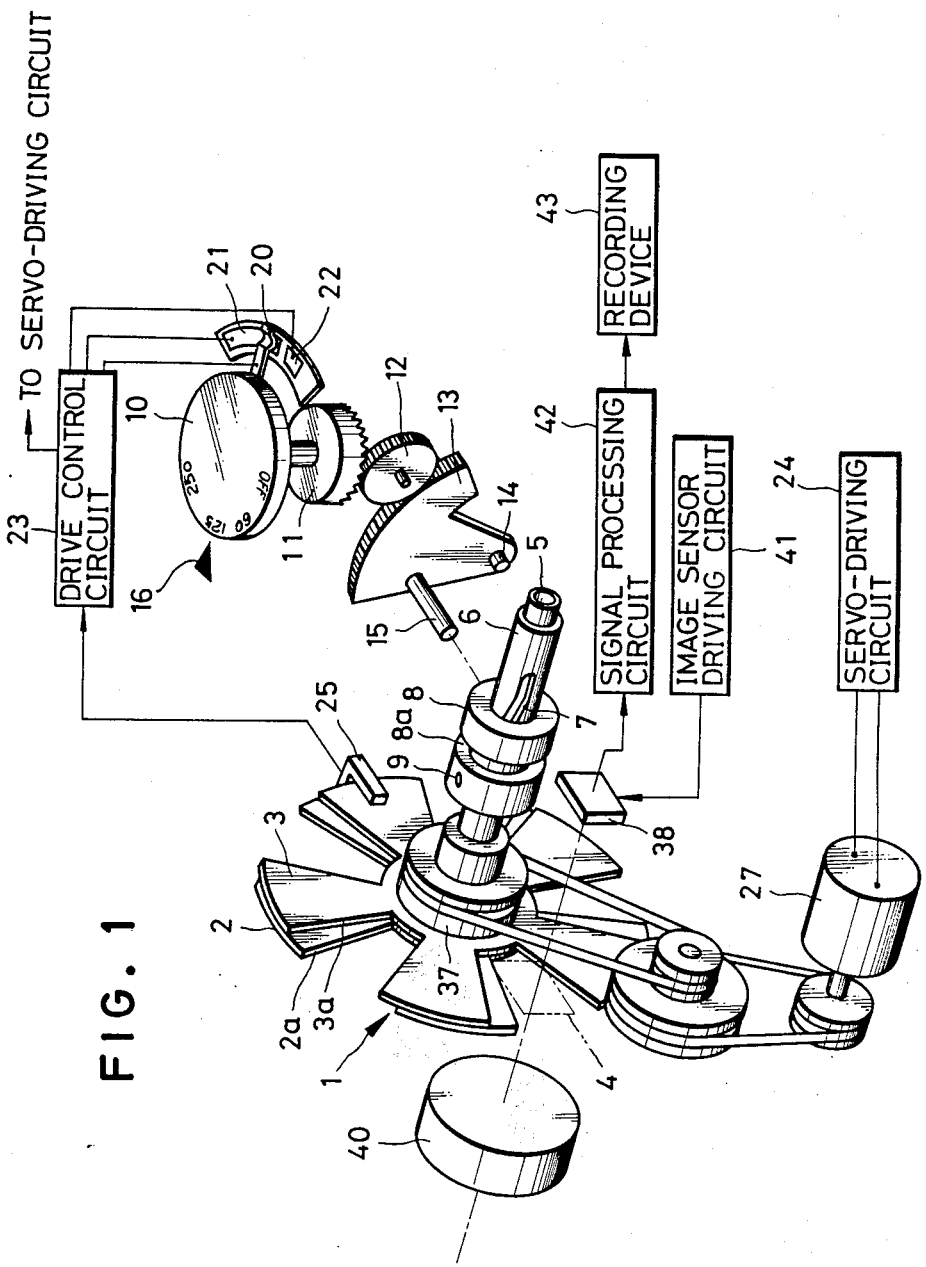
FIG. 1 is a schematic, exploded perspective view of the rotary shutter in accordance with a preferred embodiment of the invention.

Referring now to FIG. 1, there is shown the rotary shutter assembly 1 according to a preferred embodiment of the present invention.

The rotary shutter assembly 1 comprises front and rear shutter blades 2, 3, each povided with a circular array, for example five in this embodiment, of openings 2a, 3a defined by blade sectors arranged at regular intervals. These shutter blades 2, 3 are securely mounted on rotary hollow shafts 5, 6, respectively, for rotary displacment relative to each other in order to vary the effective size of the shutter openings each of which is defined between the opposite edge of the adjacent blade sectors of the shutter blades 2, 3. When the shutter blades 2, 3 are displaced to provide a maximum effective size of the shutter openings, the exposure aperture 4 can be fully opened.

For this relative displacement, the hollow inner shaft 5 with the front shutter blade 2 secured thereto is rotatably supported in the hollow outer shaft 6, these rotary shafts 5, 6 being formed with communicating cam slots, for example an axially straight cam slot (not shown) for the inner shaft 5 and a curved cam slot for the outer shaft 6. It should be noted that these rotary shafts 5, 6 are assembled to prohibit their relative axial displacement. On the outer shaft 6 an opening size control ring 8 having an annular groove 8a on its outer periphery is mounted for axial movement. The opening size control ring 8 has a pin 9 fixedly mounted thereon and radially inwardly extending therefrom, so as to enter into the cam slots at their intersection.

The annular groove 8a of the opening size control ring 8 is engaged b a pin 15 which is mounted on and extends laterally from a sector gear 13 supported on a shaft 14 for pivotal movement. The opening size control ring 8 can thus be moved axially as a result of the pivotal movement of the sector gear 13, causing the relative rotation of the inner and outer shafts 5, 6, and hence the front and rear shutter blades 2, 3, thereby varying the size of each shutter opening.

The pivotal movement of the sector gear 13 is effected by rotating a dial 10 which has a bevel gear 11 connected to the sector gear 13 through an idel gear 12. Because the size of the shutter opening defined by edges of the adjacent blade sectors of the shutter blades 2, 3 corresponds to exposure time or shutter speed, the dial 10 can also serve as a shutter speed dial when it is in its single shot selecting position. For example, a desired shutter speed is selected by turning the dial 10 until the desired shutter speed, for example "60" (which means 1/60 sec.), is aligned with an index mark 16. At this time, the opening size control ring 8 is axially displaced to its rearmost position so as entirely to superimpose the blade sectors, thereby expanding the shutter openings to their maximum size.

The dial 10 is provided with a resilient electrically conductive arm 20 which at its free end can slide on electrically conductive contacts 21, 22. A drive control circuit 23 is provided for detecting which contact 21, 22 the resilient arm 20 is contacting in order to control the operation of a servo-driving circuit 24.

The rotary shutter assembly 1 is driven by means of a motor 27, the rotary shaft of which is connected to a pulley 37 fixedly attached to the rear shutter blade 3 through a motion transmission mechanism that is well known per se. In order to monitor the phase of rotation of the rotary shutter assembly 1, there is a phase detector 25 which is interrupted by the shutter blades 2, 3, and specifically each blade sector thereof. This phase detector 25 comprises, for example, a photointerrupter which is adapted to produce a low level of pulse signal when interrupted by each blade sector of the front and rear shutter blades 2, 3 rotating in the clockwise direction, and a high level of pulse signal when there is no interrupton. Consequently, during the rotation of the rotary shutter assembly 1, the phase detector 25 provides a series of phase signals comprising low and high level pulses alternately repeated which in turn is sent to the drive control circuit 23.

Figure 2:
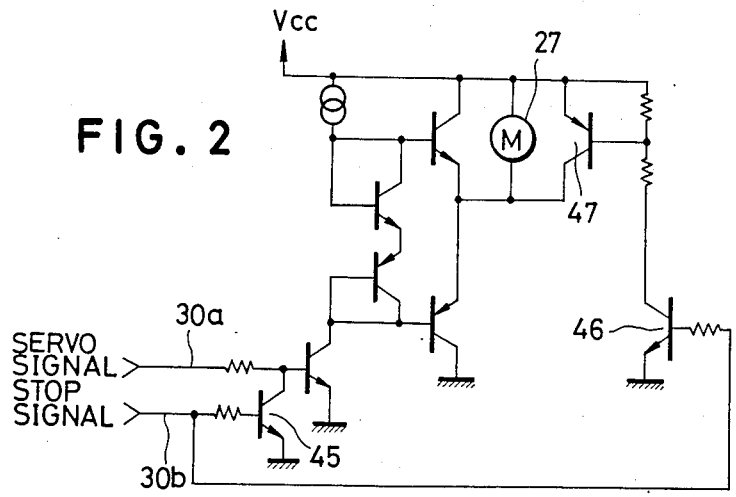
FIG. 2 is a circuit diagram, showing in detail the construction of a servo-driving circuit which is used with the rotary shutter of FIG. 1.
Figure 3:
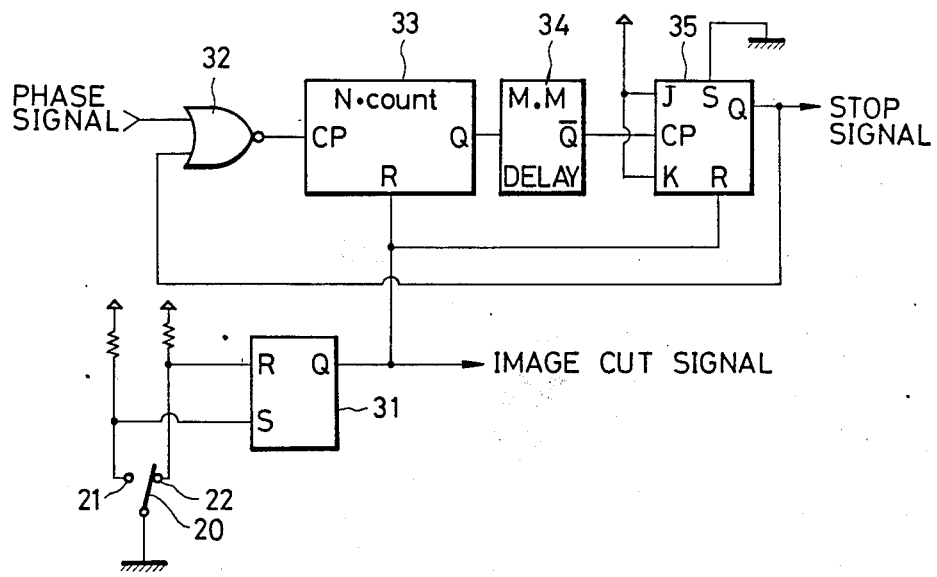
FIG. 3 is a block diagram, showing in detail the construction of a stop signal generating circuit which is used with the rotary shutter of FIG. 1.

The drive control circuit 23 is adapted to produce, in accordance with the series of phase signals transmitted by the phase detector 25, servo-signals which in turn are transmitted to the servo-driving circuit 24 at its input terminal 30a as shown in detail in FIG. 2. The servo-driving circuit 24 thereby controls the motor 27 to rotate at a constant speed. The drive control circuit 23, in this embodiment, includes a stop signal generating circuit as shown in FIG. 3 which can function not only to prevent the resilient arm 20 from chattering but also to detect which of the contacts 21, 22 the resilient arm 20 is contacting. For this purpose, the stop signal generating circuit of FIG. 3 comprises an RS flip-flop 31, a NOR gate 32, an N-count flip-flop 33, delay circuit 34 and a JK flip-flop 35 for generating stop signals, which will be described in detail later.

When turning the dial 10 to set the shutter to a desired shutter speed, for example "125" (1/125 sec.), the opening size control ring 8 is axially displaced to set the shutter opening to a size corresponding to the selected shutter speed. Simultaneously with turning the dial 10, the resilient arm 20 is brought into contact with the contact 21, thereby actuating the servo-driving circuit 24 to start the motor 27 into rotation so as to rotate the shutter blades 2, 3, simultaneously. The servo-driving circit 24 at its input terminal then receives servo signals corresponding to the phase signals from the phase detector 25 through the drive control circuit, so as to control the motor 27 to maintain the shutter blades 2, 3 at a predetemined speed of rotation. As a result of the rotation of the shutter blades 2, 3, an image of the subject formed by an objective taking lens 40 is intermittently projected onto the photoelectric conversion surface of an image pickup element or image sensor 38. During the rotation of the rotary shutter assembly 1, when a shutter button (not shown) is operated to actuate an image sensor driving circuit 41, the image sensor 38 produces photoelectric signals corresponding to the image formed thereon. The photoelectric signals are converted into video signals by a signal processing circuit 42 and then transmitted to a recording device 43 which records the video signals on a still video floppy disc by means of a magnetic recording head that is well known per se.

In the case where the resilient arm 20 is in contact with the contact 21, the rotar shutter assembly 1 is in a state of rotation (referred to hereinafter as the shutter rotating mode). In the shutter rotating mode, a high level signal from the RS flip-flop 31 is transmitted from the Q terminal to the reset terminals of the N-count and JK flip-flops 33, 35, as shown in FIG. 3. At this time, since these flip-flops 33, 35 produce no high level signal at their Q terminals, the motor 27 and hence the shutter blades 2, 3 continue to rotate.

When turning the dial 10 to set the rotary shutter to a particular shutter speed, for example "60" (1/60 sec.) in this embodiment, the resilient arm 20 is brought into contact with the contact 22. Simultaneously, the opening size control ring 8 is moved rearwardly through the cam slot, causing the shutter blades 2, 3 to undergo relative rotation so as fully to expand the shutter openings. As a result, the RS flip-flop 31 outputs, at its Q terminal, a low level signal rendering the N-count and JK flip-flops 33, 35 operative.

Figure 4:
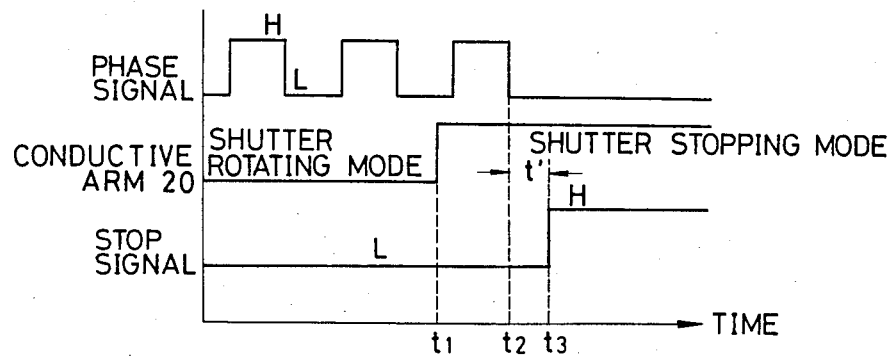
FIG. 4 is a time-sequence diagram showing the waveforms produce by the stop signal generating circuit of FIG. 3.

As shown in FIG. 4, when the dial 10 is turned to select the shutter speed of "60" (1/60 sec.) at time t1, the N-count flip-flop 33 starts, at time t1, to count low level signals contained in the phase signals. When the N-count flip-flop 33 counts two low level signals, it outputs a high level signal at its Q terminal at time t2. After a time t' has elapsed from the time t2, the delay circuit 34 outputs a high level signal at its Q terminal at time t3. As a result, the JK flip-flop circuit 35 at its Q terminal provides, at the time t3, a high level signal which in turn serves as a stop signal.

The stop signal thus provided is transmitted to an input terminal 30b of the servo-driving circuit 24 and causes both of switching transistors 45, 46 to be conductive, rendering the servo-signal at an input termnal 30a ineffective (see FIG. 2). Simultaneously, the motor 27 is de-energized via transistor 47, and is thus electrically braked to stop quickly. As a result of the quick stoppage of the motor 27, the shutter blades 2, 3 are also stopped instantaneously. On the other hand, the output of a stop signal at the Q terminal of the JK flip-flop 35 causes the NOR gate at one of its input terminals to receive no high level signal, thereby to output no high level at its output terminal. Consequently, the N-count flip-flop 33 receives no phase signal after the provision of stop signal.

Because the image sensor driving circuit 41 serves to scan the image sensor 38 so as to retrieve image signals therefrom at intervals of 1/60 sec., it is possible to pick up an image at a speed of 1/60 sec. even when the shutter is prevented from rotating. Thus, the above-described image pickup operation is referred to as the shutter stopping mode in the present specification.

Meanwhile, the provision of a high level signal from the N-count flip-flop 33 at its Q terminal is effected at the time t2, that is, at the moment just before the phase detector 25 is interrupted by the forward edge of any one of blade sectors of the shutter blades 2, 3 rotating in the clockwise direction. Therefore, according to location of the exposure aperture 4, the blade sectors of the shutter blades 2, 3 may partially cover the exposure aperture 4 at the moment of the provision of a high level signal fro the N-count flip-flop 33. For this reason, there is a delay circuit 34 in the stop signal generating circit shown in FIG. 3 in order to delay the provision of the stop signal from the JK flip-flop 35 for an appropriate time t' so as to top the shutter blades 2, 3 in a correct position where any blade sector of the shutter blades 2, 3 fully uncovers or opens the exposure aperture 4. This delay time 5' is of course finely adjustable. In spite of the provision of the time delay circuit 34, it is desirable to adjust the relative position between the exposure aperture and the phase detector 25 beforehand. As is apparent to those skilled in the art, the provision of the N-count flip-flop 33 which is adapted to output a high level signal when counting at least two countable signals means that a stop signal from the JK flip-flop 35 can be provided in synchronism with one of the phase signals, whenever the dial 10 is turned at any moment to select the shutter stopping mode.

The high level output signal at the Q terminal of the RS flip-flop 31 can also serve as an image cut signal. Image cut operation is performed by providing, between the signal processing circuit 42 and the recording device 43, a switching circuit which is adapted to be rendered non-conductive upon transmission of a high level signal thereto from the RS flip-flop 31 and to be kept non-conductive until a stop signal is output from the JK flip-flop signal 35. The switching circuit so adapted will not transmit video signals to the recording device 43 until the shutter blades 2, 3 have stopped at a position where the exposure aperture is fully opened, so as not to effect an image recording whenever the shutter button is operated but before a stop signal has been provided.

As is apparent from the above description, since the motor 27 is electrically braked upon a stop signal provided on the basis of the phase of rotation of the shutter blades 2, 3 when changing the image pickup operation from the shutter rotating mode to the shutter stopping mode, the shutter blades 2, 3 can stop in an advantageously short time without covering the exposure aperture 4 at all, allowing the immediate commencing of image pickup operations in the shutter stopping mode.

Figure 5:
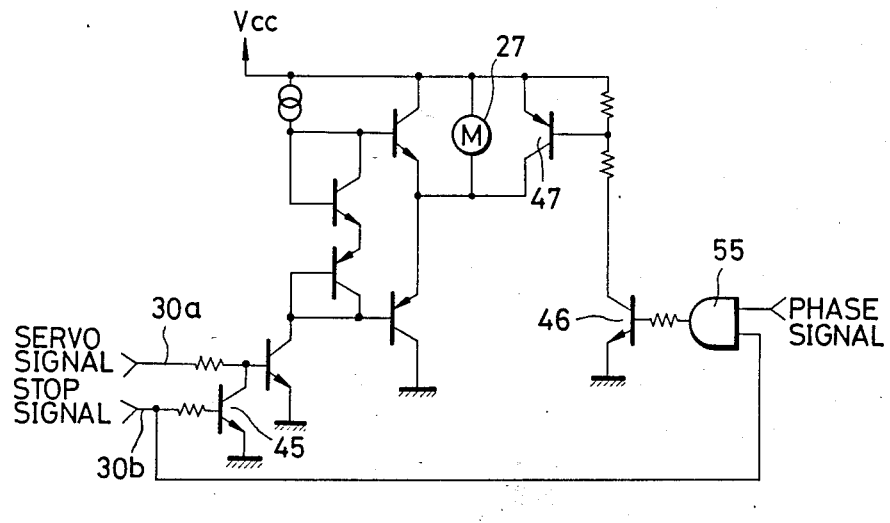
FIG. 5 is a circuit diagram similar to FIG. 2, showing in detail the construction of another servo-driving circuit which is preferably used with the rotary shutter of FIG. 1.
Figure 6:
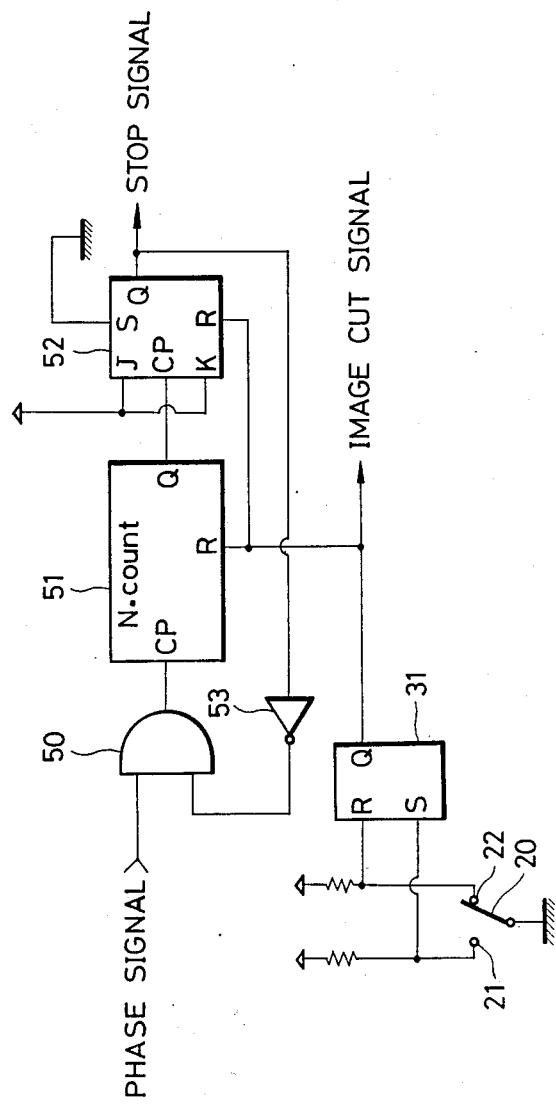
FIG. 6 is a block diagram similar to FIG. 3, showing in detail the construction of another stop signal generating circuit which is preferably used with the rotary shutter of FIG. 1.

Reference is now had to FIG. 5 showing another example of the servo-driving circuit 24 used in combination with a stop signal generating circuit as shown in FIG. 6.

In this example, high level signals contained in a series of phase signals from the phase detector 25 are counted by an N-count flip-flop 51 through an AND gate 50. Immediately upon the circuit 51 counting two high level signals, JK flip-flop 52 outputs a high level signal which in turn serves as a stop signal the same as in the previous example. The stop signal thus provided is, on the one hand, transmitted to a NOT circuit 53, rendering the AND gate 50 inoperative. As a result, the N-count flip-flop 51 receives no phase signal.

On the other hand, the stop signal is also transmitted simultaneously, through an input terminal 30b, to an AND gate 55 which receives the phase signals at one of its input terminals. Because of the intermittent high level phase signals, a switching transistor 46 connected to the AND gate 55, and hence a transistor 47, are intermittently rendered conductive, thereby intermittently braking the motor 27. Since his intermittent braking is effected in synchronism with the phase signals, the shutter blades 2, 3 can be stopped exactly at a desired position even when the shutter is rotating at such a high speed that theretofore it would have been difficult to stop it quickly. As a result, at any stopped position, the shutter blades 2, 3 do not cover the exposure aperture 4 even partially.

In the above-described embodiment, the phase detector 25 is adjusted in position relative to the exposure aperture 4 so as not to cover any part of the exposure aperture 4 at the moment when the leading edge of any one of the shutter openings is detected by the phase detector 25. This position adjustment obviates the provision of such as the delay circuit 34 shown in FIG. 3.

In the embodiments described above, when the dial 10 is turned to align the "OFF" indication with the index mark 16, the resilient arm 20 is electrically disconnected from both of the contacts 21, 22, rendering all the circuit units inoperative. When turning the dial 10 from its "OFF" indication aligned with the index mark 16 to select the shutter speed "60", since the shutter blades 2, 3 are maintained in an appropriate position fully to open the exposure aperture 4 and the motor 27 is also maintained stopped, an image pickup operation can be immediately effected by starting the image sensor driving circuit 41.

The invention has been described with particular reference to preferred illustrative embodiments thereof, but it will be understood that variations and modifications can be effected within the spirit and scope of the invention.

What is claimed is:

1. A rotary shutter for use in an electronic still camera having an exposure aperture, said shutter comprising a rotatable element having a circlar array of openings designed to be variable in size, said rotary shutter further comprising;
    an electric motor for rotating said rotatable element thereby intermittently to open and close said exposure aperture;
    means for generating a series of phase signals corresponding to the rotation of said rotatable element;
    means for generating stop signals in synchronism with said phase signals when a particular size of said shutter openings is selected by the user; and
    means actuated by at least one of said stop signals for electrically braking said motor such that said rotatable element is stopped at a position where any one of said shutter openings fully exposes said exposure aperture.

2. A rotary shutter as defined in claim 1, wherein said phase signal generating means compises a photosensor adjacent the periphery of said rotatable element which detects the passage of each said opening of said rotatable element therethrough.

3. A rotary shutter as defined in claim 2, wherein said braking means is a circuit for de-energizing said motor.

4. A rotary shutter as defined in claim 3, wherein said braking means intermittently de-energizes said motor by said stop signals in synchronism with the phase of rotation of said rotatable element.

5. A rotary shutter as defined in claim 1, wherein said rotatable element comprises two axially superposed shutter blades, each being formed with a circular array of openings, which blades are mounted for relative rotation with respect to each other so as to vary the size of said shutter openings defined by superposed pairs of said openings.

6. A rotary shutter for use in an electronic still camera having an exposure aperture, said shutter comprising two axially superposed rotatable shutter blades, each said blade having a circular array of openings, and means to displace angularly said two superposed shutter blades relative to each other for varying the size of shutter openings defined by adjacent superposed pairs of said openings of said shutter blades, said rotary shutter further comprising:
    an electric motor for simultaneously rotating both said shutter blades in order to open and close said exposure aperture intermittently;
    means for producing a series of phase signals corresponding to the rotation of said shutter blades;
    means for generating stop signals in synchronism with said phase signals when a particular size of said shutter openings is selected by the user; and
    means actuated by at least one of said stop signals to brake electrically said motor, thereby stopping said shutter blades at a position where any one of said shutter openings of particular size opens fully said exposure aperture.

7. A rotary shutter as defined in claim 6, wherein said phase signal producing means comprises a photosensor disposed to be interrupted by said shutter blades.

8. A rotary shutter as defined in claim 7, wherein said braking means is a circuit for de-energizing said motor.

9. A rotary shutter as defined in claim 8, wherein said braking means intermittently de-energizes said motor by said stop signals in synchronism with the phase of rotation of said shutter blades.

10. A rotary shutter as defined in claim 6, wherein said angular displacing means is a shutter speed selecting dial.

11. A rotary shutter as defined in claim 10, wherein said particular size of said shutter openings is obtained responsive to the selection of a shutter speed of one sixtieth of a second with said shutter speed selecting dial.

* * * * *